May 26, 1959     J. W. HORTON     2,888,530
IMPACT RESPONSIVE CAMERA FOR AUTOMOBILES
Filed Feb. 16, 1956
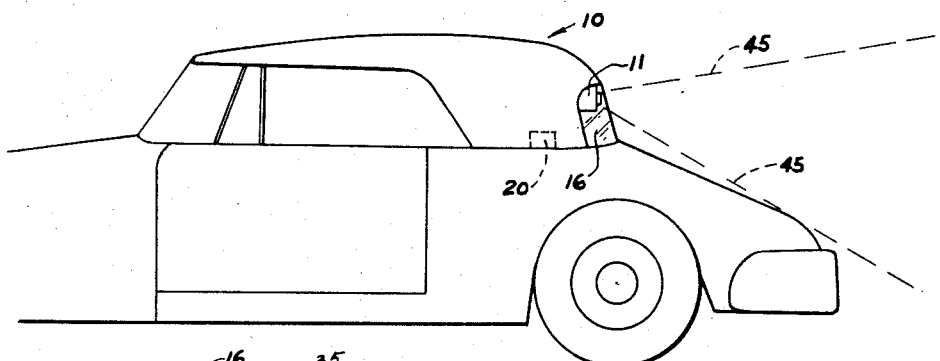
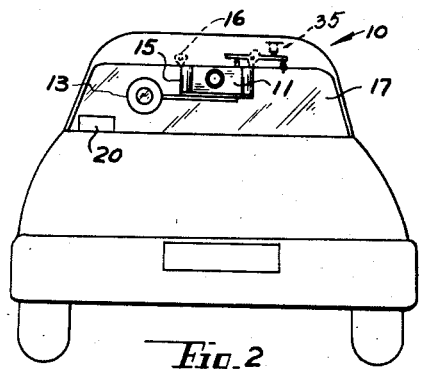
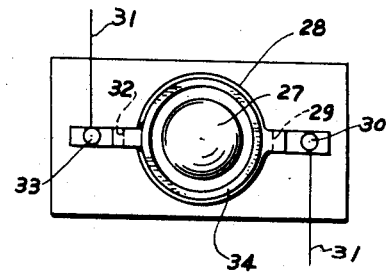
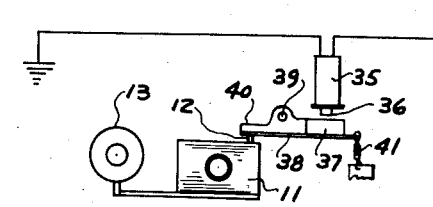
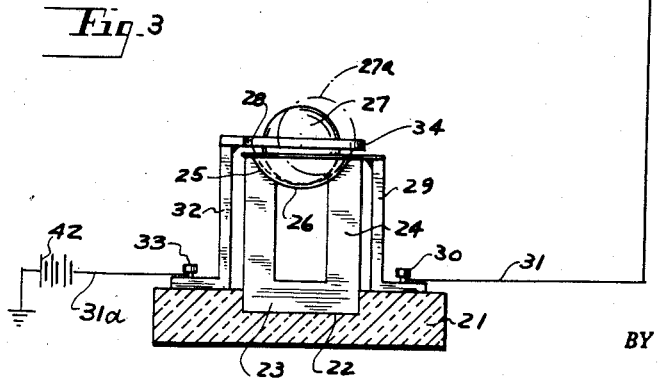
INVENTOR.
JERRY W. HORTON.
BY *Louis Chayka*
ATTORNEY.

United States Patent Office 2,888,530
Patented May 26, 1959

2,888,530
IMPACT RESPONSIVE CAMERA FOR AUTOMOBILES

Jerry W. Horton, Detroit, Mich.

Application February 16, 1956, Serial No. 565,824

1 Claim. (Cl. 200—61.52)

The invention pertains to a camera which may be mounted in an automobile in such a manner that its lens will be directed and focussed upon objects such as another vehicle colliding with the automobile in which the camera is mounted.

The object of the invention is to secure a photographic picture of the vehicle or object colliding with said automobile, but especially the picture of the license plate or other identifying details contained in or carried by said vehicle.

A more specific object of the invention is to provide means operated by electric current whereby a picture of this type will be taken automatically by the camera without the need of personal attention to the operation of said camera. A further object of the invention is to provide a special switch in an electric circuit which will include means for the operation of the camera, wherein the switch will be responsive to a sudden shock or jar such as produced by a collison between two vehicles at least one of which is in motion at the time.

I shall now describe my improvement with reference to the accompanying drawings in which;

Fig. 1 is side elevational view of the body of an automobile, the view disclosing the preferred position of a camera mounted therein;

Fig. 2 is a rear elevational view of the automobile, the view including the camera mounted therein;

Fig. 3 is a diagrammatic presentation of the electric circuit for the operation of the camera, the view including the camera, a flash gun, electromagnetic means for the operation of the camera, and an automatic magnetic switch for the circuit;

Fig. 4 is a top elevational view of the switch shown in Fig. 3.

Similar numerals refer to similar parts throughout the several views.

Numeral 10 in Fig. 1, indicates generally an automobile in which numeral 11 indicates a camera. The camera is preferably of the type which employs a roll film and which is equipped with a spring motor to wind up the film automatically after an exposure, and to set the shutter for the next one. As the light conditions for exposure of the film in the camera differ greatly from day to day, and with the weather conditions of each day, the camera is equipped with a flash gun 13, which, according to the accepted practice, is equipped with its own dry batteries.

The shutter of the camera is to be operated by an electromagnet adapted to depress a push button 12 projecting from the body of the camera. The latter is disposed in a caselike holder 15, which is secured by tabs 16 to the roof portion framing the rear window 17 of the automobile.

The electromagnet, marked 35, is mounted adjoining the camera in a position to depress the push button 12 when energized by current from the storage battery of the automobile. This calls for a switch which will be responsive to a sudden impact from an outside body against the automobile, but which will remain normally inactive during ordinary jostling and jarring of the automobile due to the average road conditions. As the switch is of novel construction, I shall describe it with reference to the drawings in Figs. 3 and 4.

The switch may be located in a container 20 which is to be placed preferably remotely from the camera as shown in Fig. 2, for an easy and ready access thereto. The switch includes a base 21 of a dielectric material, the base being provided with a slot 22 for reception of the lower portion 23 of a permanent magnet. The magnet is of a modified horse-shoe design, including two parallel members 24, the outer end of each member being defined by an arcuate concave face 25. Resting on said faces and bridging the gap therebetween, is a dish 26 which is made of a thin nonmagnetic substance such as a plastic or foil aluminum. Located within the dish is a steel ball 27, of such a diameter that a part of the ball will be disposed over the two poles so as to be in the path of the magnetic lines of force between said poles.

The dish includes a rim 28 which is connected to a vertical standard 29 mounted on the base 21 along one side of the magnet. The standard is made of a good conductor of electricity, preferably of metal, and is provided with a screw 30 for attachment to an insulated wire shown by means of a line 31.

In a diametrically opposed relation to the standard 29, is another standard 32, also preferably made of metal, and also provided with a screw marked 33 for connection to a wire 31a. Supported by said standard 32, at the top thereof, is a metal ring 34 which is disposed at a level above the top of the dish 25 in a spaced relation thereto, the center of the ring being alined with the center of the dish. The ring encompasses the ball 27 but is normally out of touch therewith.

The aforesaid wire 31 leads to said electromagnet 35. Disposed opposite the core 36 of the electromagnet, is a soft iron bar 37, which is supported upon one end portion of a beam 38. The beam, which is pivoted intermediate its length at 39, includes a short arm 40 forming the opposite end portion of said beam. The arm, in its normal position, is in contact with the push button 12. A spring 41, anchored at one end to a stationary member within the automobile, is attached at the other end to the portion of the beam which supports the iron bar 37, and keeps said bar in a normally spaced relation to the core 36 of the electromagnet.

The manner in which the camera operates is quite obvious:

Normally the ball 27 is kept between the poles of the permanent magnet by the magnetic lines of force between said poles, the magnetic attraction of the ball to the poles being intense enough to hold the ball in place in spite of ordinary jars and shaking to which an automobile is exposed, owing to unevenness of ground upon which the automobile may travel. However, should the body of the automobile or any part thereof be struck as by being rammed by another vehicle, the ball would be thrown from its position in the center of the dish against the ring 34 encircling the dish when for a moment, the ball would be in contact with both the dish and the ring. The position of the ball at said moment is shown in dotted lines 27a in Fig. 3. As the ring and the dish are but elements in the same electric circuit, but are normally spaced from each other, the ball, contacting both, would close the circuit. This would energize the electromagnet 35, and bring about the depression of the push button 12 of the camera, which button actuates the shutter in said camera. Substantially simultaneously with the opening of the shutter, the flash bulb would be set off to supply sufficient light for the purpose of imprinting on the film a latent record of the area covered by the lens of the camera.

In the case illustrated in Fig. 1, the field covered by the lens, as shown in dotted lines 45, would include an area close to the rear portion of the automobile 10, so that the details of any object within that area would be relatively large and clear.

Returning to the subject of the switch, it will be understood that following the momentary contact of the ball 27, with the ring 34 and the dish 26, the ball would fall back by gravity into the dish where it would again be drawn by the poles of the magnet into a relatively fixed position within said dish.

Aside from the flash gun, which would need another light bulb, the camera, if provided with automatic spring winding device, would automatically be ready for another exposure.

It will be understood that the camera may be mounted for use in any position suitable for the purpose of which said camera is to be used, and that structural details of the switch may be modified without departing from the inventive concept disclosed herein. What I therefore wish to claim is as follows:

A switch of impact type in an electric circuit for use in an auto vehicle, the switch comprising a vertically-positioned horse-shoe magnet, means for support thereof, the poles of the magnet being turned upwardly, a dish-like container of non-magnetic material seated upon the two poles, a metal ball responsive to the pull of the magnetic lines of force, the ball being seated in the dish but straddling the gap between the poles, the dish being connected to means forming one terminal of the circuit, a metal ring encircling the ball at a level above the top of the dish but below the top of the ball and connected to another terminal of the circuit, the ball being adapted to be thrown off by an impact against the means supporting the magnet from the center of the dish for contact with the ring while still supported by said dish, said ball serving as a means of closing said circuit.

References Cited in the file of this patent
UNITED STATES PATENTS

| | | |
|---|---|---|
| 1,372,671 | Cressall | Mar. 29, 1921 |
| 1,701,800 | Taylor | Feb. 12, 1929 |
| 2,303,360 | Irwin et al. | Dec. 1, 1942 |
| 2,319,010 | McLeod | May 11, 1943 |
| 2,415,086 | Detwiler | Feb. 4, 1947 |
| 2,428,273 | Finnegan | Sept. 30, 1947 |
| 2,679,186 | Schulte | May 25, 1954 |
| 2,744,976 | Black | May 8, 1956 |